(12) United States Patent
Baumfalk et al.

(10) Patent No.: US 7,603,921 B2
(45) Date of Patent: Oct. 20, 2009

(54) DEVICE FOR FASTENING A SENSOR ON CONTAINERS

(75) Inventors: Reinhard Baumfalk, Göttingen (DE); Oscar-Werner Reif, Hanover (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 433 days.

(21) Appl. No.: 11/642,264

(22) Filed: Dec. 20, 2006

(65) Prior Publication Data

US 2007/0157748 A1      Jul. 12, 2007

(30) Foreign Application Priority Data

Jan. 11, 2006     (DE) ...................... 10 2006 001 610

(51) Int. Cl.
*G01M 19/00*     (2006.01)
(52) U.S. Cl. ..................................... 73/866.5; 73/865.9
(58) Field of Classification Search ................ 73/865.9, 73/866.5
See application file for complete search history.

(56) References Cited

U.S. PATENT DOCUMENTS 6,332,369 B1 *  12/2001  Bombe et al. ............ 73/864.73
6,538,569 B1 *   3/2003  Dunn ........................ 340/540
2001/0033233 A1 * 10/2001  Jentsch et al. .......... 340/870.17

FOREIGN PATENT DOCUMENTS

| EP | 517151 A2 * | 12/1992 | ................. 24/90.1 |
| JP | 2005278748 A | * | 10/2005 |
| WO | WO 2005068059 A1 | * | 7/2005 |

* cited by examiner

*Primary Examiner*—Thomas P Noland
(74) *Attorney, Agent, or Firm*—Anthony J. Casella; Gerald E. Hespos

(57) ABSTRACT

Device for fastening a sensor on containers with a flexible container wall, in particular mixing bags, comprising a sensor support which is fitted with a sensor, bears against an inner wall of the container wall at least with a rear subsurface averted from the sensor, and is guided with a central piece through an opening in the container wall in which the sensor support is fixed on the container wall by a clamping part which can be connected to the central piece, in which the container wall is clamped between the rear subsurface of the sensor support and on a bearing surface, facing an outer wall of the container, of the clamping part, and in which the rear subsurface bears sealingly against the inner wall of the container wall. The sensor support can also have an electronic or optical transmit unit which is connected to the sensor, in which case the transmit unit communicates in a wireless fashion with a receive unit arranged outside the container.

8 Claims, 3 Drawing Sheets

DEVICE FOR FASTENING A SENSOR ON CONTAINERS

BACKGROUND OF THE INVENTION

1. Field of the Invention

The invention relates to a device for fastening a sensor on containers with a flexible container wall, in particular mixing bags, comprising a sensor support which is fitted with a sensor, bears against an inner wall of the container wall at least with a rear subsurface averted from the sensor, and is guided with a central piece through an opening in the container wall.

The invention also relates to a device for fastening a sensor on containers with a flexible container wall, in particular mixing bags, comprising a sensor support which is fitted with the sensor and is arranged on an inner wall of the container wall with a rear surface averted from the sensor.

2. Description of the Related Art

Such devices are used chiefly in flexible containers which are preferably designed as disposal containers or mixing bags. Such mixing bags are used in the pharmaceutical/biotechnology industry, in which the most varied of applications require sterile liquids to be not only refilled, transported and stored, but also manipulated. This includes, for example, mixing processes in which liquid or solid media must be added to the sterile liquids and be mixed with one another under control. It is frequently necessary in this case to measure process variables such as, for example, temperature or the pH value of the sterile liquids.

WO 2005/068059 A1 discloses a mixing bag which has a sensor for measuring a parameter of the mixture. In this case, the mixing bag is made available to the user in an already sterilized form. When sensors arranged inside the mixing bag are used, they require a communication link to a control unit arranged outside the bag. It must be ensured here that the sterility inside the mixing bag is not impaired. Use is made for this purpose of a device for fastening the sensor on the container wall or mixing bag wall and in which the sensor is inserted.

It is disadvantageous in the case of the known device that because its sensor support is bonded to the wall of the container or mixing bag, the adhesive can impair the medium or the mixture in the mixing bag. If the sensor support is welded to the wall of the mixing bag, leaks can occur at the welding seam as the mixing bag is being handled.

It is therefore an object of the present invention to make available a device for fastening a sensor which, on the one hand, ensures a reliable communication link to the outside and, on the other hand, preserves the stability in the interior on the mixing bag and does not impair the mixing in the bag.

SUMMARY OF THE INVENTION

In accordance with the subject invention, this object is achieved, firstly, by virtue of the fact that a sensor support is fixed on the container Wall by a clamping part which can be connected to the central piece, that the container wall is clamped between the rear subsurface of the sensor support and on a bearing surface, facing an outer wall of the container, of the clamping part, and that the rear subsurface bears sealingly against the inner wall of the container wall.

A leakproof and reliable connection between the sensor support and container wall arises because the container wall is clamped between the sensor support and clamping part and the rear subsurface bears against the inner wall of the container wall. The sterility in the container is therefore not impaired and it is possible to completely dispense with adhesives between the container wall and sensor support.

In accordance with a preferred embodiment of the invention, the clamping part can be latched with the central piece.

The device can be mounted easily and cost effectively, given that the central piece and the clamping part can be latched with one another.

According to a further preferred embodiment of the invention, the clamping part can be screwed to the central piece.

A simple and reliable connection of the device to the container wall likewise arises from screwing the clamping part to the central piece. The screw fitting can be bonded on the thread in order to enhance the security of the connection. In addition, possible tolerances between the parts screwed to one another can more easily be compensated in the case of a screw fitting.

In accordance with a further preferred embodiment of the invention, the rear subsurface has one or more clamping projections which engage in the container wall in a fashion transverse to the container wall.

The clamping projections, which engage in the container wall, ensure that the container wall cannot be withdrawn laterally from the clamping connection.

According to a further preferred embodiment of the invention, the bearing surface of the clamping part has one or more clamping projections which engage in the container wall in a fashion transverse to the container wall. The clamping projections are designed as annular webs, in particular in the case of screwing of the clamping part. The clamping projections of the sensor support and of the clamping part are coordinated with one another and, for example, arranged offset from one another.

In accordance with a further preferred embodiment of the invention, an electrical or optical connection is guided through the central piece of the sensor support from the sensor to a sensor electronics outside the container.

In this case, the electrical or optical connection can be arranged reliably in the central piece. For example, it can be cast, together with the sensor, in the central piece or the sensor support. It is also possible to arrange electrical or optical coupling on the central piece.

Furthermore, the object is achieved by virtue of the fact that the sensor support has an electronic or optical transmit unit which is connected to the sensor and that the transmit unit communicates in a wireless fashion with a receive unit arranged outside the container.

A cut-out in the container wall can be dispensed with owing to the transmit unit in the sensor support. Outside the container, all that is then required is a corresponding receive unit for wireless communication, which can be of reusable design. Welding the sensor support to the container wall is possible here in principle without a problem, since possible sealing problems of the welding seam play no role here.

In accordance with a preferred embodiment of the invention, the sensor support has on its rear surface a central piece which is surrounded in a form-fitting fashion by a bulge of the container wall.

Welding or bonding can be dispensed with owing to the bulge at the central piece which is surrounded in a form-fitting fashion by a corresponding bulge in the container wall. However, it is sufficient in principle to insert the central piece into a bulge in the container wall, and to fix it via a clamping ring fitted from outside and which can have the requisite receive unit.

Further details of the invention emerge from the following detailed description and the attached drawings, in which preferred embodiments of the invention are illustrated by way of example.

DETAILED DESCRIPTION OF THE PREFERRED EMBODIMENTS

Figure 1:
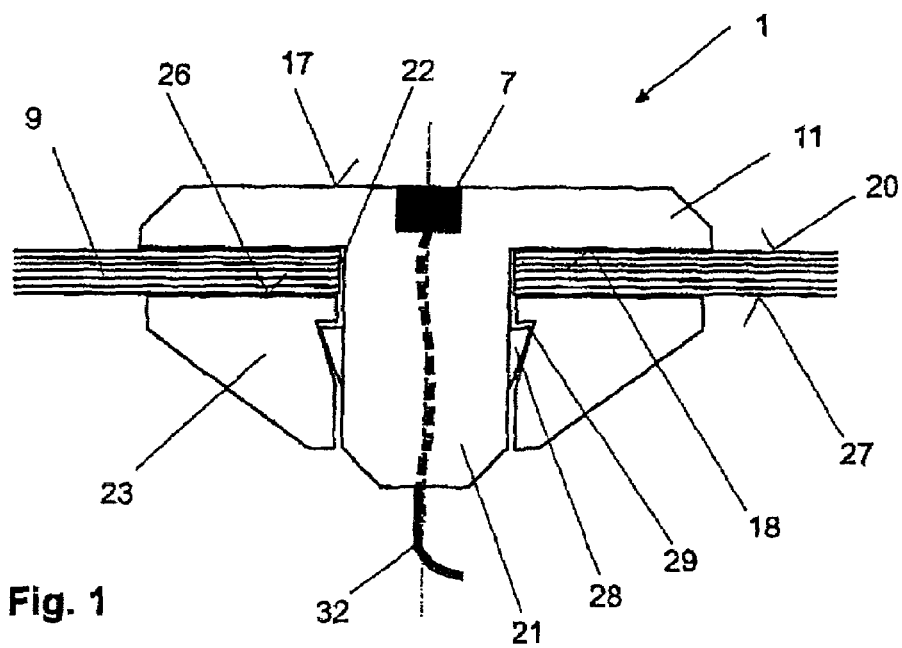
FIG. 1 shows, in section, a side view of a device for fastening a sensor in the case of which a clamping part can be latched with a central piece.

Turning to FIGS. 1-6 respectively, a device 1, 2, 3, 4, 5, 6 for fastening a sensor 7, 8 on containers with a flexible container wall 9 essentially comprises a sensor support 11, 12, 13, 14, 15, 16 and a sensor 7, 8.

The sensor supports 11, 12, 13, 14, 15, 16 exhibit the sensor 7, 8 in the region of their front surfaces 17. The sensor supports 11, 12, 13, 14, 15, 16 bear against an inner wall 20 of the container wall 9 with their rear subsurface 18 or rear surface 19 averted from the front surface 17.

In the region of their rear subsurface 18, the sensor supports 11, 12, 13, 14 respectively have a central piece 21, 10 which is guided through an opening 22 in the container wall 9 and connected to a clamping part 23, 24, 25. The clamping part 23, 24, 25 has a bearing surface 26 with the aid of which it bears against an outer wall 27, averted from the inner wall 20, of the container wall 9 such that the container wall 9 is clamped between the rear subsurface 18 and bearing surface 26, and the bearing surface 26 bears sealingly against the inner wall 20.

Figure 3:
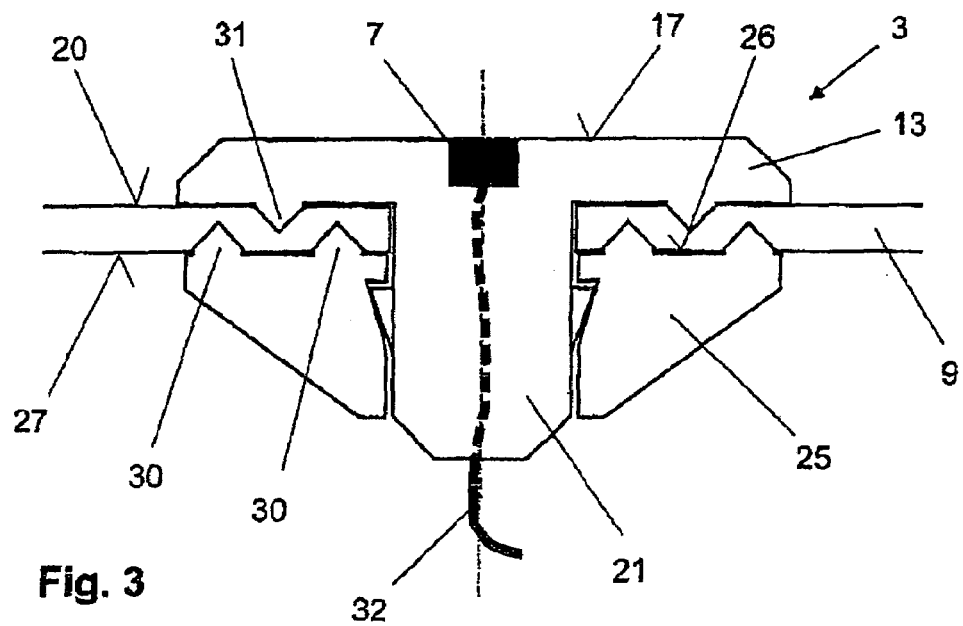
FIG. 3 shows a side view of a device for fastening a sensor in the case of which the clamping part and central piece can be latched and have clamping projections.
Figure 4:
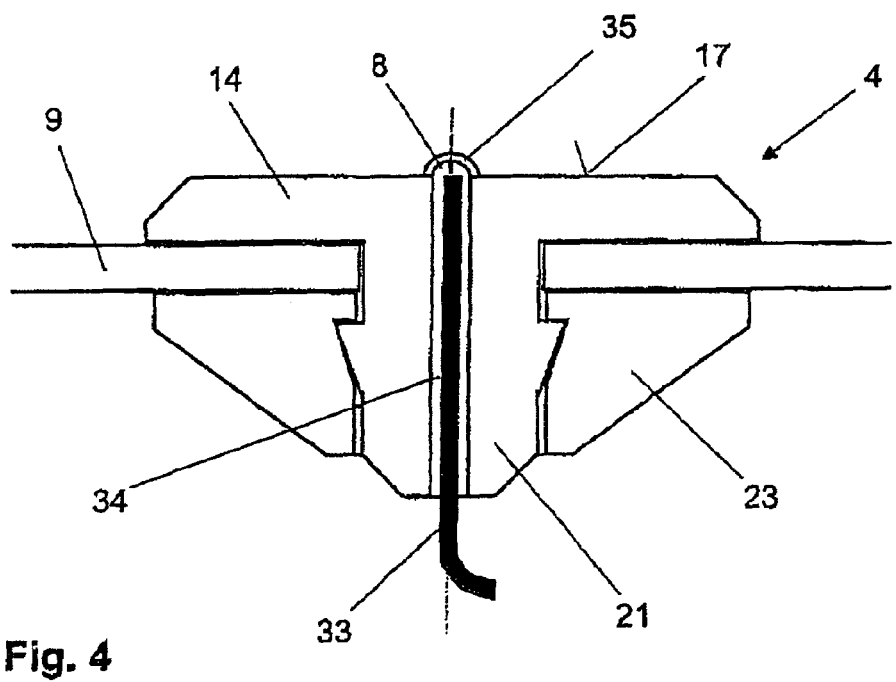
FIG. 4 shows, in section, a side view of a device for fastening a sensor which has an optical sensor and an optical signal line.

In accordance with the embodiments of FIG. 1 and FIG. 4, the clamping part 23 can be latched with the central piece 21 and, in accordance with FIG. 3, the clamping part 25 can be latched with the central piece 21. The central piece 21 of the sensor supports 11, 13 and 14 respectively has for this purpose a circumferential latching lug 28 which latches with a circumferential latching groove 29 in the clamping parts 23, 25.

Figure 2:
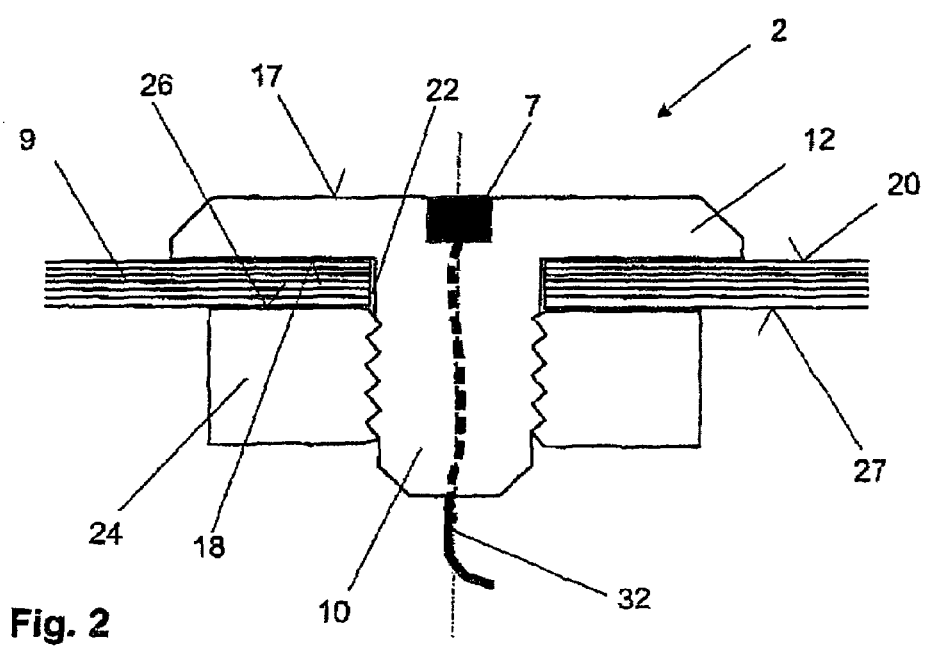
FIG. 2 shows, in section, a side view of a device for fastening a sensor in the case of which a clamping part can be screwed to a central piece.

According to an embodiment in accordance with FIG. 2, the clamping part 24 can be screwed to the central piece 10 of the sensor support 12.

According to the embodiment in accordance with FIG. 3, the clamping part 25 has on its bearing surface 26 two clamping projections 30 designed as annular webs, and the sensor support 13 has on its rear subsurface 18 a clamping projection 31 designed as an annular web. The clamping projection 31 of the sensor support 13 is arranged in this case on the diameter which lies between the diameters of the two clamping projections 30 of the clamping part 25.

The sensor 7 is embedded in the sensor supports 11, 12, 13, 15 and 16. In accordance with FIGS. 1, 2 and 3, the sensor 7 is connected to a sensor electronics (not illustrated) via an electric connection 32 which is guided through the central piece 21.

In accordance with the exemplary embodiment of FIG. 4, an optical sensor 8 is formed by an end of a light guide which is connected as optical connection 33 to a sensor electronics or sensor control unit (not illustrated). The optical connection 33 is guided in a central bore 34 for the central piece 31 of the sensor support 14. In the region of the front surface 17 of the sensor support 14, the central bore 34 is covered sealingly by a transparent cover 35. In conjunction with a corresponding coating, in this case the transparent cover can act as the actual sensor.

Figure 5:
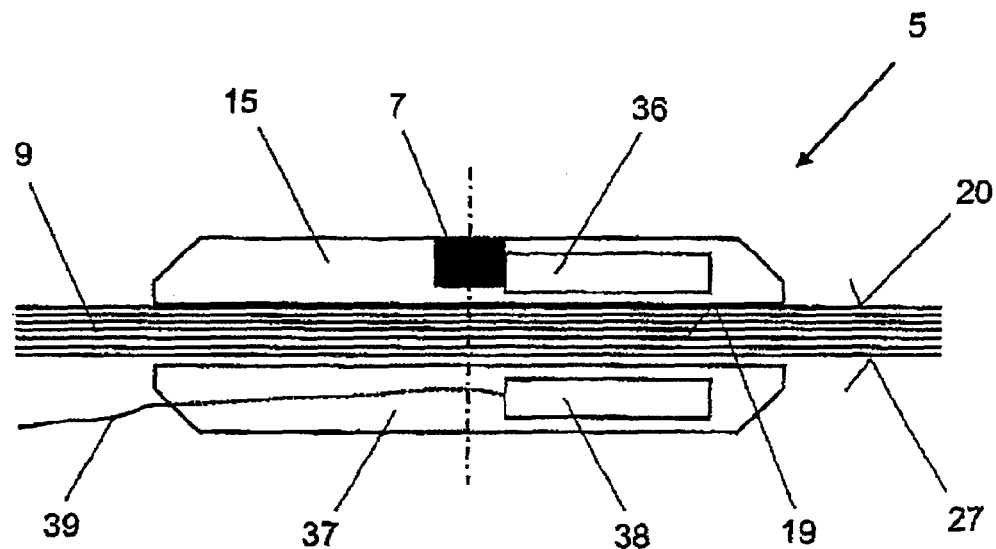
FIG. 5 shows, in section, a side view of a device for fastening a sensor which has a transmit unit which is connected to the sensor.

According to an embodiment in accordance with FIG. 5, the sensor support 15 bears with its rear surface 19 averted from the sensor 7 against the inner wall 20 of the flexible container wall 9. For the purpose of fixing, the sensor support 15 is welded to the container wall 9. In this case, the sensor 7 embedded in the sensor support 15 is connected to a transmit unit 36, which is likewise embedded in the sensor support 15 and can also be designed as a transmit/receive unit. A receive part 37 with a receive unit 38, which can communicate with the transmit unit 36 of the sensor support 15, can be placed outside the container wall 9 or the container. The receive unit 38 can likewise be designed as a transmit/receive unit. The receive unit 38 or transmit/receive unit is then connected to a sensor electronics (not illustrated) via an electrical connection 39.

Figure 6:
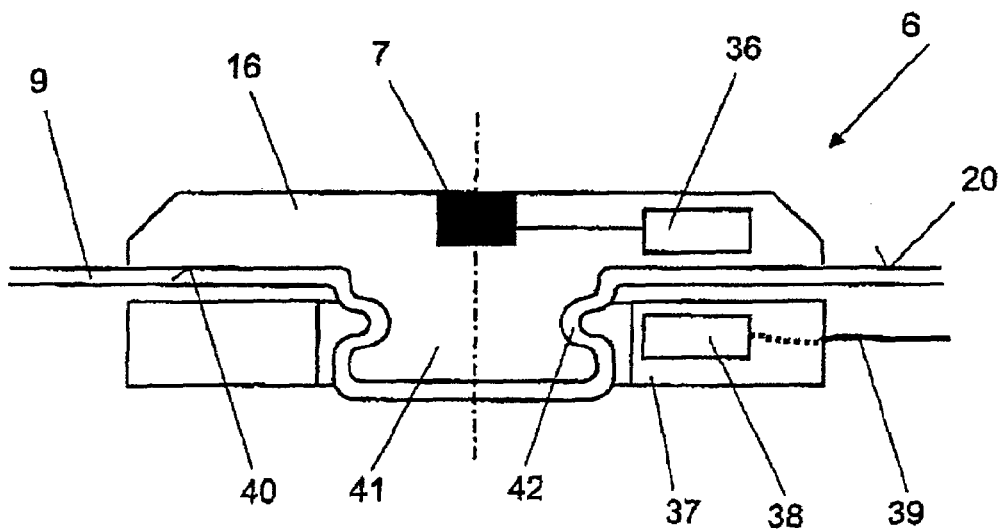
FIG. 6 shows a side view of a further device for fastening a sensor with a sensor support which has a transmit unit which is connected to the sensor and whose central piece is surrounded in a form-fitting fashion by a bulge in the container wall.

According to an embodiment in accordance with FIG. 6, the sensor support 16 has on its rear surface 40 a central piece 41 which is surrounded in a form-fitting fashion by a bulge 42 in the container wall 9.

While the invention has been described with respect to certain preferred embodiments, it is apparent that various changes can be made without departing from the spirit and scope of the invention as defined by the appended claims.

What is claimed is:

1. Device (1, 2, 3, 4) for fastening a sensor (7, 8) on containers with a flexible container wall (9), comprising a sensor support (11, 12, 13, 14) which is fitted with a sensor (7, 8), bears against an inner wall (20) of the container wall (9) at least with a rear subsurface (18) averted from the sensor (7, 8), and is guided with a central piece (10, 21) through an opening in the container wall (9), characterized in that the sensor support (11, 12, 13, 14) is fixed on the container wall (9) by a clamping part (23, 24, 25) which can be connected to the central piece (10, 21), in that the container wall (9) is clamped between the rear subsurface (18) of the sensor support (11, 12, 13, 14) and on a bearing surface (26), facing an outer wall (27) of the container, of the clamping part (23, 24, 25), and in that the rear subsurface (18) bears sealingly against the inner wall (20) of the container wall (9).

2. Device according to claim 1, characterized in that the clamping part (23, 25) can be latched with the central piece (21).

3. Device according to claim 1, characterized in that the clamping part (24) can be screwed to the central piece (10).

4. Device according to claim 1, characterized in that the rear subsurface (18) has one or more clamping projections (30, 31) which engage in the container wall (9) in a fashion transverse to the container wall (9).

5. Device according to claim 4, characterized in that the bearing surface (26) of the clamping part (24) has one or more clamping projections (30, 31) which engage in the container wall (9) in a fashion transverse to the container wall (9).

6. Device according to claim 5, characterized in that the clamping projections (30, 31) are designed as annular webs.

7. Device according to claim 6, characterized in that the clamping projections (30, 31) of the sensor support (13) and the clamping part (25) are coordinated with one another.

8. Device according to claim 7, characterized in that an electrical (33) or optical (32) connection is guided through the central piece (10, 21) of the sensor support (11, 12, 13, 14) from the sensor (7, 8) to a sensor electronics outside the container.

* * * * *